United States Patent [19]

Eichfeld et al.

[11] Patent Number: 5,799,291
[45] Date of Patent: Aug. 25, 1998

[54] ARRANGEMENT FOR THE SEPARATE PROCESSING OF FUZZY RULES OF DIFFERING IMPORTANCE

[75] Inventors: Herbert Eichfeld; Thomas Künemund, both of München, Germany

[73] Assignee: Siemens Aktiengesellschaft, Munich, Germany

[21] Appl. No.: 687,586

[22] PCT Filed: Jan. 25, 1995

[86] PCT No.: PCT/DE95/00115

§ 371 Date: Aug. 9, 1996

§ 102(e) Date: Aug. 9, 1996

[87] PCT Pub. No.: WO95/22099

PCT Pub. Date: Aug. 17, 1995

[30] Foreign Application Priority Data

Feb. 11, 1994 [DE] Germany .................. 44 04 426.7

[51] Int. Cl.[6] ........................................... G06F 9/44
[52] U.S. Cl. ........................... 706/1; 706/5; 706/900
[58] Field of Search ........................ 395/3, 51, 61, 395/900

[56] References Cited

U.S. PATENT DOCUMENTS

| | | | |
|---|---|---|---|
| 4,985,824 | 1/1991 | Husseiny et al. | 364/187 |
| 5,031,224 | 7/1991 | Mengel et al. | 382/10 |
| 5,077,677 | 12/1991 | Murphy et al. | 395/10 |
| 5,109,522 | 4/1992 | Lent et al. | 395/800 |
| 5,321,491 | 6/1994 | Summers et al. | 356/53 |
| 5,371,832 | 12/1994 | Eichfeld et al. | 395/3 |
| 5,546,506 | 8/1996 | Araki et al. | 395/900 |
| 5,600,757 | 2/1997 | Yamamoto et al. | 395/900 |

FOREIGN PATENT DOCUMENTS

A 42 25 758  10/1994  Germany.

OTHER PUBLICATIONS

Automatisierungstechnische Praxis 34 (1992) 4, Fuzzy Control—Heuristic control by means of fuzzy logic, Hans–Peter Preuss, pp. 176–184.

Automatisierungstechnische Praxis 34 (1992) 5, Fuzzy Control—Heuristic control by means of fuzzy logic, Hans–Peter Preuss, pp. 239–246.

*Primary Examiner*—George B. Davis
*Attorney, Agent, or Firm*—Hill & Simpson

[57] ABSTRACT

The arrangement stores, in a knowledge base memory (KBM), important (dominant) and less important rules such that they can be distinguished from one another. From a rule weighting (gi) and from an aggregated rule weighting (Gi–1) is formed. The unsharp OR linking has a unit (BSUM) for forming a limited sum, if an important rule is present, and has a unit (MAX) for forming a maximum if a less important rule is present. In this way it is ensured that each important rule, for which the rule evaluation results in a rule weighting greater than zero, has an effect on the sharp value of the relevant output variable.

1 Claim, 1 Drawing Sheet

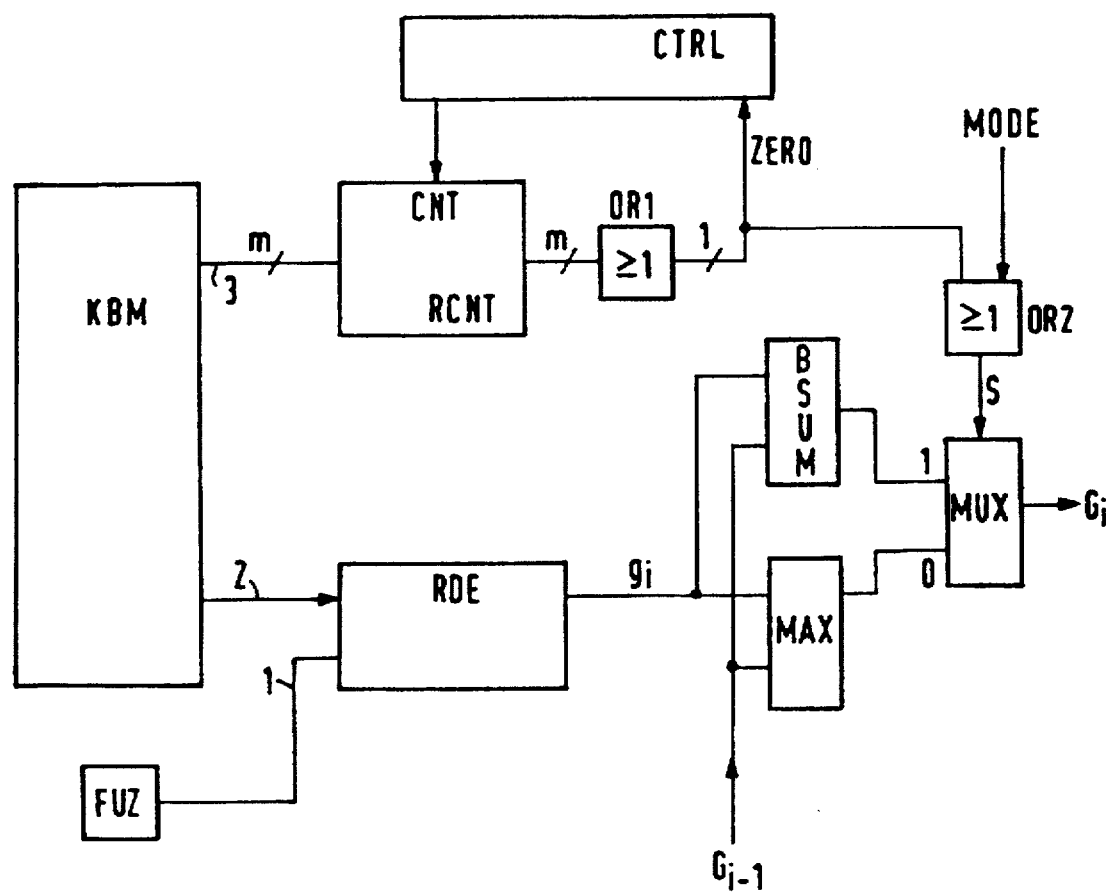

5,799,291

1

ARRANGEMENT FOR THE SEPARATE PROCESSING OF FUZZY RULES OF DIFFERING IMPORTANCE

BACKGROUND OF THE INVENTION

On the basis of the respective specific circumstances of the control problem which is to be solved, the linguistic protocol of a fuzzy controller will generally contain rules of differing importance. This circumstance can be taken into account, for example, by each rule being provided with a scaling factor for the importance of the respective rule. This superficial solution, however, has the serious disadvantage that a corresponding arrangement requires a great deal of memory space and is thus in practice unsuited for fuzzy controller hardware with on-chip memory.

The German journal atp-Automatisierungstechnische Praxis 34 (1992), 4, pages 176 to 184, and 5, pages 239 to 246, discloses a fuzzy controller in which individual conditions in the IF part of a respective rule are linked by means of unsharp AND links in the form of a minimum linking to form an overall condition, and output values from the THEN parts of rules are linked by means of unsharp OR links in the form of a maximum linking to form an overall consequence.

German Offenlegungsschrift DE 42 25 758 A1 discloses the possibility that rule groups having important and less important rules can be formed and that the important rules can be unsharply OR linked by means of a limited sum formation and the less important rules can be unsharply OR linked by means of a maximum formation.

SUMMARY OF THE INVENTION

The object on which the invention is based is, then, to specify an arrangement in which it is ensured that at least each important (dominant) rule, whose conditional part (IF part) is satisfied, has an influence on the sharp value of the respective output variable and cannot be completely "masked out" by less important rules having possibly higher membership function values, as is the case in known fuzzy controllers, and in which particularly little memory space and control outlay is necessary.

In general terms the present invention is an arrangement for separate processing of fuzzy rules of differing importance. In a knowledge base memory, important and less important rules are stored such that they can be distinguished from one another. From a rule weighting of a respective rule and from an aggregated rule weighting of previous rules, using a unit for forming an unsharp OR link, a new aggregated rule weighting is formed. The unit for forming an unsharp OR link is a unit for forming a limited sum, if an important rule is present, and is a unit for forming a maximum, if a less important rule is present. A one input of a multiplexer is connected to the output of the unit for forming the limited sum and a zero input of the multiplexer is connected to the output of the unit for forming a maximum. A controller is provided such that, in the knowledge base memory, all the important rules in one block are addressed chronologically after the less important rules. A load input of a reverse counter is fed the number, stored in the knowledge base memory, of the important rules. The controller, after the processing of a respective rule, supplies a signal to a counting input of the reverse counter until all the important rules have been processed. The output signal of the reverse counter is OR linked bit by bit and serves as a control signal for the multiplexer. There is in each case at one input of both units the respective rule weighting and there is in each case at a further input of both units the previous aggregated rule weighting.

2

The advantage of the invention is in particular that, above all in the case of fuzzy controllers which are flexible in use, there results only a very slight additional cost in terms of circuitry, since in this case, in order to implement an unsharp OR link, in addition to a unit for maximum forming, provision is in any case made of at least one further unit such as, for example, a unit for forming a limited sum.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, and in which:

The single FIGURE is a block diagram of the present invention.

DESCRIPTION OF THE PREFERRED EMBODIMENTS

Shown in the single FIGURE is a block diagram which has a knowledge base memory KBM, a fuzzification unit FUZ, a rule decoder/rule evaluation unit RDE, a unit BSUM for forming a limited sum, a unit MAX for forming a maximum, a multiplexer MUX and two OR circuits OR1 and OR2. The knowledge base memory KBM can in this case be constructed as an external memory or else as a so-called on-chip memory of a fuzzy controller and contains, in encoded form, the linguistic protocol of a fuzzy controller. The more precise function and the construction of the fuzzification unit FUZ and of the unit RDE are not important for the present invention. In order to understand the overall arrangement better, however, it should be mentioned at this point that the rule decoder/rule evaluation unit RDE forms, for one rule i, a rule weighting gi from values 1 of the fuzzification unit FUZ and values 2, which correspond to the linguistic protocol and originate from the knowledge base memory KBM.

The rule weighting gi in this case corresponds to the truth value of the IF part of a respective rule i.

To form the aggregated rule weightings Gi, in each case all the rule weightings Gi of rules are combined which lead, in the THEN part of the respective rule, to the same linguistic value of the output variable, the combination being carried out serially, by means of an unsharp OR link in the form of a unit (MAX) for forming a maximum or in the form of a unit (BSUM) for forming a limited sum.

The rule weightings gi of the individual rules i are also combined in the case of arrangements which do not permit separate processing of fuzzy rules of differing importance by means of an unsharp OR linking to form an aggregated rule weighting Gi, this taking place as a rule in that a respective rule weighting gi is linked with a respective previous aggregated rule weighting Gi−1 to form a respective new aggregated rule weighting Gi, until a completely aggregated rule weighting Gi is present. The unsharp OR linking is in many cases implemented in the form of a maximum linking, but can also be implemented by means of other functions such as, for example, a limited sum.

A unit for forming a limited sum is in general to be understood as referring to a unit at whose output the sum of the two inputs is available, providing the sum does not exceed a limiting value, and at whose output the limiting value is present if the sum is greater than the limiting value.

If several units for forming an unsharp OR connection are provided, these may be selected, for example, by means of the multiplexer MUX, the output of the respectively selected unit being switched through to the multiplexer output as a function of a control signal s.

Now, in the case of the arrangement according to the invention, if the important and less important rules are stored in separate blocks in the knowledge base memory KBM and a sequence controller CTRL is provided such that the block with all the important rules is addressed chronologically after the less important rules, it is then sufficient to make available to the reverse counter RCNT, during the processing of the less important rule, the value zero and, before processing the important rules, to provide at its load input LD the number, stored in the knowledge base memory KBM, of the important rules and, following each processing of an important rule, to feed a counting pulse to the counting input CNT of the reverse counter until all the important rules have been processed.

The aggregated rule weightings of the less important rules are to be calculated first and stored temporarily and only then are the rule weightings of the important rules summed in a limited manner via the unit BSUM. If the converse sequence were to be used, the previous aggregated rule weighting Gi−1=0 would be at the beginning, and the unit BSUM would not act.

In the case of a maximum of 2m−1 important rules, the load input LD and the output of the reverse counter RCNT have the word width m. As soon as all the important rules have been processed, the reverse counter has the value zero. The output of the reverse counter is linked bit by bit by means of the OR circuit OR1, as a result of which a logic zero results at the output of the OR circuit OR1 exactly at the point when the reverse counter exhibits the value zero. The output signal ZERO of the OR circuit OR1 is used, in a sequence controller CTRL, for the purpose of providing no further counting pulses for the counting input CNT of the reverse counter. In other words, this means that as soon as the output signal ZERO exhibits a logic zero, processing of the less important rules is carried out.

This output signal of the OR circuit OR1 can then also be used for forming the control signal s for the multiplexer MUX, and, depending on whether an important or a less important rule is present, either the unit for forming a limited sum or the unit for forming a maximum is used for the unsharp OR linking. In this case it is of significant importance that the important rules are unsharply OR linked with the aid of the unit for forming a limited sum, and the less important rules are unsharply OR linked with the aid of the unit for forming a maximum.

If, in addition to the control of the multiplexer on the basis of the importance of the rules, deliberate control of the multiplexer MUX is additionally desired, then, as shown in the drawing, a second OR circuit OR2 is necessary, whose output supplies the control signal s, whose first input is connected to the output of the OR circuit OR1 and whose second input receives an external selection signal MODE.

The arrangement is in principle suitable for any fuzzy controller, but in particular for flexible fuzzy controller hardware in which in any case several options for unsharp OR linking are provided and which have an on-chip memory for the linguistic protocol.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. An arrangement for separate processing of fuzzy rules of differing importance, comprising:

knowledge base memory for storing more important rules and less important rules such that the more and less important rules can be distinguished from one another;

a new aggregated rule weighting that is formed from a rule weighting of a respective rule and from a previous aggregated rule weighting of previous rules, using an arrangement for forming an unsharp OR link;

the arrangement for forming an unsharp OR link having a unit for forming a limited sum, if a more important rule is present, and having a unit for forming a maximum, if a less important rule is present;

a multiplexer having a one input connected to an output of the unit for forming the limited sum and having a zero input connected to an output of the unit for forming a maximum;

a controller for controlling the knowledge base memory such that all the more important rules in one block are addressed chronologically after the less important rules of the knowledge base memory;

a reverse counter having a load input and a counting input, the load input being fed the number, stored in the knowledge base memory, of the more important rules, the controller, after the processing of a respective rule, supplying a signal to the counting input of the reverse counter until all the more important rules have been processed;

the reverse counter having an output signal that is OR linked bit by bit and that serves as a control signal for the multiplexer; and each of the units for forming a limited sum and the unit for forming a maximum having a first input supplied with the rule weighting of the respective rule and a second input supplied with the previous aggregated rule weighting.

* * * * *